Nov. 5, 1935. M. E. PEESO 2,019,630
FISHING TACKLE
Filed Nov. 14, 1934
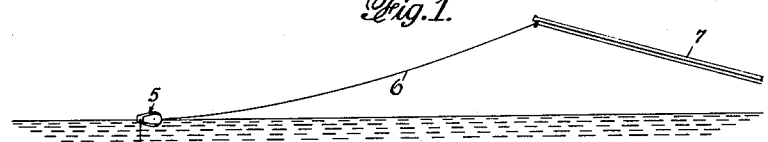
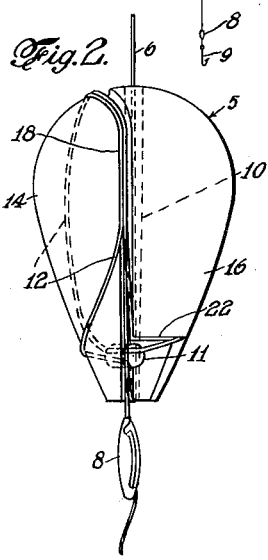
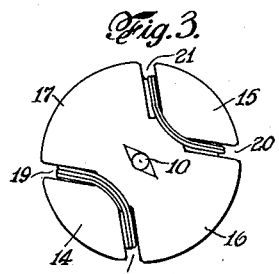
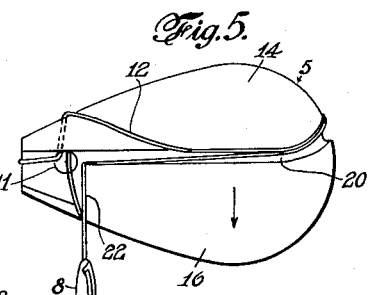
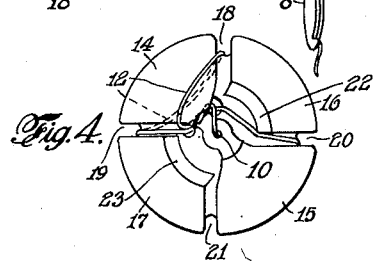
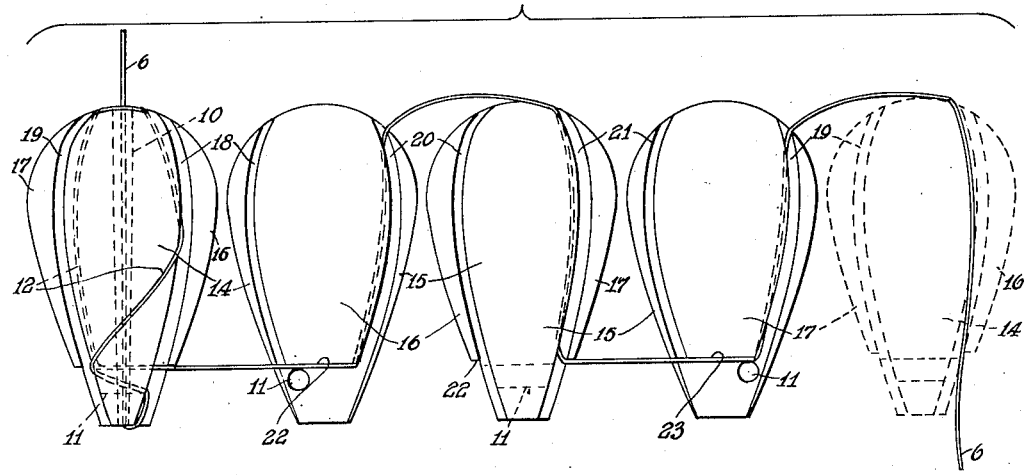
INVENTOR
Martin E. Peeso
BY
Williams, Rich & Morse
ATTORNEYS Patented Nov. 5, 1935

2,019,630

UNITED STATES PATENT OFFICE 2,019,630

FISHING TACKLE

Martin E. Peeso, White Plains, N. Y.

Application November 14, 1934, Serial No. 752,911

7 Claims. (Cl. 43—49)

This invention relates generally to fishing tackle, and has particular reference to means for overcoming certain difficulties encountered particularly in still fishing, as when a float is employed.

As is well known, one of the primary objects of the float is to maintain the baited hook off bottom and at a predetermined distance from the surface of the water. Ordinarily the float is held in one of various possible positions of adjustment, depending upon the depth of the water and the distance at which it is desired to maintain the baited hook off bottom, and the hook-end of the fishing line is permitted to dangle below the float. Under such conditions it is impossible to execute a cast, even with the aid of a casting rod, especially when the dangling hook-end of the line is of any appreciable length. Aside from the fact that such relation of the float to the dangling hook-end of the line makes it impossible to attain any substantial distance on the cast, there exists the ever-present danger of fouling the line on the cast, as will be readily appreciated when it is taken into account that the hook-end of the line tends to lag behind the float from the instant the cast is initiated until the float, in association with the hook-end of the line, has completed its flight, such lag being due, of course, to the fact that as the cast is initiated the propelling force is applied directly to the float rather than to the hook-end of the line, with the result that the hook-end of the line is caused to trail the float in its flight.

An object of my invention is to provide an improved means by which the foregoing difficulties may be obviated, and to that end the invention contemplates a line-carrying element, which is capable of buoyantly supporting the hook-end of the line, including its baited hook, and which is adapted to be held in various positions of adjustment on the line, and which is so shaped as to present a plurality of lobes extending in the same general direction with reference to its axis and collectively forming a tortuous line-receiving groove-like path adapted to receive the hook-end of the line in position to be supported by said lobes in loop formation and in position to be unwound therefrom under the action of gravity acting on the hook-end of the line upon completion of the cast.

Other objects and advantages of the invention will become apparent from the following description, when taken in connection with the accompanying drawing, in which Fig. 1 is a view illustrative of the positions assumed upon the completion of a cast by the tip end of a casting rod, the rod end of a fishing line, the hook-end of such line and the buoyant line-carrying element, on which the hook-end of the line is carried during flight and from which the hook-end of the line is unwound, as shown, under the action of gravity upon completion of the cast; Fig. 2 is a view in elevation of the buoyant line-carrying element, the hook-end of the line being illustrated as wound on the line-carrying element preparatory to a cast; Fig. 3 is a top view of the line-carrying element as it appears in Fig. 2; Fig. 4 is a bottom view of the line-carrying element as it appears in Fig. 2; Fig. 5 is a view in elevation of the line-carrying element, and showing it in position to release the hook-end of the line under the action of gravity pursuant to the cast, and Fig. 6 is a schematic view, showing in full-line elevation successive quadrant faces of the line-carrying element and showing in dotted lines at the right a duplication of the full-line quadrant face appearing at the left, the view as a whole being of a composite nature in order to illustrate with clarity the manner in which the line-receiving element may be held against displacement with reference to the line and further illustrating the manner in which the hook-end of the line may be wound about the several lobes preparatory to a cast.

Although the device which embodies the present invention and which comprises a line-carrying element indicated as a whole by the numeral 5, does not depend for its utility upon any particular method of casting, it is herein illustrated as an accessory to a fishing line 6, and as such it is adapted to be cast by the aid of a rod 7, on which, of course, is carried the usual line-accommodating reel, not shown.

The line-carrying element 5, which may be constructed of any suitable material such as wood, is capable of buoyantly supporting the hook-end of the line, together with such accessories as a sinker 8 and a hook 9, and is provided longitudinally of its length with a centrally disposed and downwardly tapered passage 10 through which the line may be threaded before attaching the sinker 8 and the hook 9, the smaller end of the passage being sufficiently large to accommodate the line but yet sufficiently small to prevent the entrance of any objectionable object such as particles of water vegetation and the like. Although the body portion of the line-carrying element may assume various shapes, it is preferably substantially pear-shaped, the smaller end being adjacent the hook-end of the line.

In order that the line-carrying element 5 may be maintained in any desired position of adjustment on the line 6, it is provided at its smaller end with a transverse loop-receiving opening 11, which is located in an offset relation to the central longitudinal passage 10 and through which a loop-like portion 12 of the hook-end of the line may be threaded so that it may be looped about one or the other of a pair of lobes 14 and 15 provided at diametrically opposed locations on the line-receiving element, which loops are respectively located intermediate a pair of similar lobes 16 and 17 also provided at diametrically opposed locations on the line-receiving element.

As to the lobes 14, 15, 16, and 17, they may be formed, as when the line-carrying element 5 is constructed of wood, by slotting the line-carrying element at suitable locations so as to provide a plurality of grooves 18—19, 20—21 which are of substantial depth and which extend generally lengthwise of the line-carrying element and collectively form a tortuous line-receiving groove-like path, adapted to receive the hook-end of the fish line in position to be supported by the lobes in loop formation when casting and in position to be unwound therefrom under the action of gravity acting on the hook-end of the line upon completion of the cast. In order to insure the hook-end of the line against undue retention, as when being unwound under the action of gravity upon completion of the cast, it has been found desirable to so form the companion grooves 18—19, 20—21 that they emerge from the line-receiving element at the upper end thereof and there terminate somewhat short of each other, so as to present therebetween a smooth or uninterrupted surface over which the line passes as it is wound from one groove into the other when conditioning the device for a cast.

As shown most clearly in Fig. 6, the lobes 16 and 17 terminate at a substantial distance from the lower end of the line-receiving element, thus providing ledge-like shoulders 22 and 23, which are adapted to receive the hook-end of the line as it is looped or passed beneath the lobes 16 and 17 when being wound on the line-carrying element.

The manner in which the hook-end of the line is wound on the line-carrying element may be best understood from an inspection of Figs. 4 and 6, wherein it will be observed that the return portion of the line, where it emerges from the transverse loop-receiving opening 11, is first passed beneath the shoulder 22, then looped over the lobe 15 by way of grooves 20 and 21, then passed beneath the shoulder 23, then looped over the lobe 14 by way of grooves 19 and 18, thus completing one entire winding phase, which phase may be repeated or carried further, as described, until the entire or substantially the entire length of the hook-end of the line is wound on the line-carrying element where it is held on the several lobes in loop formation during the cast and in position to be unwound therefrom under the action of gravity upon completion of the cast.

From the foregoing, it will be understood that the line-carrying element and the hook-end of the line are held in compact association with each other as a unit, which may be easily cast over great distances while the intimacy of union between the hook-end of the line and the line-carrying element is maintained. Upon completion of the flight, however, the line-carrying element assumes a substantially horizontal position on the surface of the water, whereupon the sinker 8, under the action of gravity, exerts a downward pull on the free end of the line, as will be readily understood from Fig. 5, and thus transmits a force of rotation to the line-carrying element at a point off-center with respect to its longitudinal axis. Such force as is exerted under the action of gravity to the line-carrying element causes that element to rotate about its longitudinal axis, with the result that the line is free to drop from the successive grooves 18, 20, 21 and 19 as they pass downwardly below the central horizontal plane of the line-carrying element, the line-carrying element being at the same time subjected to a slight oscillatory movement as the line drops from successive grooves, inasmuch as the force of rotation is shifted alternately from end to end of the line-carrying element. So long as any portion of the hook-carrying end of the line remains in a supported condition on the line-carrying element, such element will continue to rotate until the entire length of the hook-end of the line, as determined by the position of adjustment of the line-carrying element on the line, is released, provided of course the position of the line-carrying element is such that the length of the hook-end of the line is less than the depth of the water in the particular locality being fished.

In order to ascertain the depth of water in any locality with the view to determining the position at which the line-carrying element must be set in order that the baited hook may be maintained at a predetermined distance off bottom, the line-carrying element is first set at such a position as to afford a hook-end of line of somewhat greater length than the depth of water in the locality to be fished, whereupon the hook-end of the line is wound onto the line-carrying element in the manner previously described. When the cast is executed, the line-carrying element, upon coming to rest on the water, will be caused to rotate only during such time as is required for the release of a sufficient length of the hook-end of the line to reach bottom, the surplus portion of the hook-end of the line remaining intact on the line-carrying element. Upon retrieving the line, as a whole, the unwound length of the hook-end of the line will represent the depth of the water in the particular locality to be fished. Knowing the depth of the water, it becomes a simple matter to adjust the line-carrying element to obtain such a length of the hook-end of the line as will enable the baited hook to be maintained at any desired distance off bottom when the hook-end of the line is released from the line-carrying element upon completion of the cast. Of course, it will be understood that when it is desired to fish on bottom, it is merely necessary to so set the line-carrying element that the length of the hook-end of the line is somewhat greater than the depth of the water in the particular locality to be fished, in which case such portion of the hook-end of the line as is released from the line-carrying element pursuant to the cast will be of sufficient length to reach bottom, the surplus portion of the hook-end of the line remaining intact on the line-carrying element which ceases to rotate the instant bottom is reached.

Aside from the fact that the line-carrying element is adapted for use in the several particulars hereinbefore described, it is further adapted, following the cast, to function in the capacity of a bobber, regardless of whether one is fishing on bottom or at any distance therefrom.

Although only one form of the invention is herein shown and described, it will be understood that various modifications may be made without departing from the spirit of the invention or the scope of the following claims.

What is claimed is:

1. A device of the character described comprising a buoyant body member shaped to present a plurality of lobes extending in the same general direction with reference to the axis of the body member and collectively forming a tortuous line-receiving groove-like path adapted to receive the hook-end of a fishing line in position to be supported by said lobes in loop formation when casting and in position to be unwound therefrom as the body member is subjected to buoyancy and is moved from one position to another under the action of gravity acting on the hook-end of the line upon completion of the cast.

2. A device of the character described comprising a buoyant body member having a plurality of slots formed therein and extending in the same general direction with reference to the axis of the body member and defining a plurality of lobes extending in the same general direction with reference to the axis of the body member and collectively forming a tortuous line-receiving groove-like path adapted to receive the hook-end of a fishing line in position to be supported by said lobes in loop formation when casting and in position to be unwound therefrom as the body member is subjected to buoyancy and is moved from one position to another under the action of gravity acting on the hook-end of the line upon completion of the cast.

3. A device of the character described comprising a body member having a central passage adapted to receive a fishing line on which the body member is adapted to assume various positions of adjustment and also having a loop-receiving opening through which a loop-like portion of the hook-end of the line may be threaded, said body member being shaped to present a plurality of lobes extending in the same general direction with reference to the axis of the body member, one of which is adapted to receive thereon said loop-like portion whereby said body member may be maintained in a definite position of adjustment on the fishing line, the several lobes collectively forming a tortuous line-receiving groove-like path adapted to receive the free portion of the hook-end of the fishing line in position to be supported by said lobes in loop formation when casting and in position to be unwound therefrom as the body member is moved from one position to another under the action of gravity acting on the hook-end of the line upon completion of the cast.

4. A device of the character described comprising a body member having a central passage adapted to receive a fishing line on which the body member is adapted to assume various positions of adjustment and also having a loop-receiving opening through which a loop-like portion of the hook-end of the line may be threaded, said body member having a plurality of slots formed therein and extending in the same general direction with reference to the axis of the body member and defining a plurality of lobes extending in the same general direction with reference to the axis of the body member, one of which is adapted to receive thereon said loop-like portion whereby said body member may be maintained in a definite position of adjustment on the fishing line, the several lobes collectively forming a tortuous line-receiving groove-like path adapted to receive the free portion of the hook-end of the fishing line in position to be supported by said lobes in loop formation when casting and in position to be unwound therefrom as the body member is moved from one position to another under the action of gravity acting on the hook-end of the line upon completion of the cast.

5. A device of the character described comprising a buoyant body member having a definite geometrical configuration and having a major axis and including a plurality of lobes extending generally lengthwise of said axis and collectively forming a tortuous line-receiving groove-like path adapted to receive the hook-end of a fishing line in position to be supported by said lobes in loop formation when casting and in position to be unwound therefrom as the body member is subjected to buoyancy and is rotated about said axis under the action of gravity acting on the hook-end of the line upon completion of the cast.

6. A device of the character described comprising a body member having a definite geometrical configuration and having a major axis and having a central passage adapted to receive a fishing line on which the body member is adapted to assume various positions of adjustment and also having a loop-receiving opening through which a loop-like portion of the hook-end of the line may be threaded, said body member including a plurality of lobes extending in the same general direction with reference to the axis of said body member, one of which is adapted to receive thereon said loop-like portion whereby said body member may be maintained in a definite position of adjustment on the fishing line, the several lobes collectively forming a tortuous line-receiving groove-like path adapted to receive the free portion of the hook-end of the fishing line in position to be supported by said lobes in loop formation when casting and in position to be unwound therefrom as the body member is rotated about said axis under the action of gravity acting on the hook-end of the line upon completion of the cast.

7. A device of the character described comprising a body member having a tapered central passage adapted to receive a fishing line, said body member being shaped to present a plurality of lobes extending in the same general direction with reference to the axis of the body member and collectively forming a tortuous line-receiving groove-like path adapted to receive the hook-end of a fishing line in position to be supported by said lobes in loop formation when casting and in position to be unwound therefrom under the action of gravity acting on the hook-end of the line upon completion of the cast.

MARTIN E. PEESO.